United States Patent
High et al.

(10) Patent No.: US 11,580,614 B2
(45) Date of Patent: Feb. 14, 2023

(54) SYSTEMS AND METHODS FOR DELIVERING PRODUCTS VIA AUTONOMOUS GROUND VEHICLES TO RESTRICTED AREAS DESIGNATED BY CUSTOMERS

(71) Applicant: Walmart Apollo, LLC, Bentonville, AR (US)

(72) Inventors: Donald R. High, Noel, MO (US); Bruce W. Wilkinson, Rogers, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 17 days.

(21) Appl. No.: 17/307,382

(22) Filed: May 4, 2021

(65) Prior Publication Data
US 2021/0319529 A1    Oct. 14, 2021

Related U.S. Application Data

(63) Continuation of application No. 15/798,992, filed on Oct. 31, 2017, now abandoned.

(60) Provisional application No. 62/420,122, filed on Nov. 10, 2016.

(51) Int. Cl.
| | | |
|---|---|---|
| *G06Q 50/28* | (2012.01) | |
| *G05D 1/02* | (2020.01) | |
| *G06Q 10/083* | (2023.01) | |
| *G07C 9/30* | (2020.01) | |

(Continued)

(52) U.S. Cl.
CPC ........... *G06Q 50/28* (2013.01); *G05D 1/0088* (2013.01); *G05D 1/0214* (2013.01); *G05D 1/0278* (2013.01); *G05D 1/0282* (2013.01); *G06Q 10/083* (2013.01); *G07C 9/00309* (2013.01); *G07C 9/00896* (2013.01); *G07C 9/30* (2020.01); *G07C 2009/00388* (2013.01); *G07C 2009/00928* (2013.01)

(58) Field of Classification Search
CPC .... G06Q 50/28; G05D 1/0088; G05D 1/0278; G07C 9/00309; G07C 9/00896; G07C 2009/00388; G07C 2009/00928
USPC .......................................................... 701/23
See application file for complete search history.

(56) References Cited

U.S. PATENT DOCUMENTS

| | | |
|---|---|---|
| 7,979,173 B2 | 7/2011 | Breed |
| 8,461,803 B2 | 6/2013 | Cohen |
| 9,134,426 B1* | 9/2015 | Siris .................. G06N 5/04 |

(Continued)

FOREIGN PATENT DOCUMENTS

| | | |
|---|---|---|
| GB | 2571221 | 8/2019 |
| WO | 2018089257 | 5/2018 |

OTHER PUBLICATIONS

"Here to Deliver"; https://www.starship.xyz/forbusinesses/; Jun. 30, 2016; pp. 1-4.

(Continued)

*Primary Examiner* — Isaac G Smith
(74) *Attorney, Agent, or Firm* — Fitch, Even, Tabin & Flannery, LLP

(57) ABSTRACT

In some embodiments, methods and systems are provided that provide for facilitating delivery, via autonomous ground vehicles, of products ordered by customers of a retailer to customer-specified restricted areas accessible by an entryway openable via an access code.

20 Claims, 3 Drawing Sheets

(51) Int. Cl.
*G05D 1/00* (2006.01)
*G07C 9/00* (2020.01)

(56) References Cited

U.S. PATENT DOCUMENTS

| | | | |
|---|---|---|---|
| 9,373,149 | B2 | 6/2016 | Abhyanker |
| 9,534,905 | B1* | 1/2017 | Bostick ............... G01C 21/206 |
| 9,550,577 | B1 | 1/2017 | Beckman |
| 9,573,684 | B2 | 2/2017 | Kimchi |
| 10,245,993 | B1* | 4/2019 | Brady ...................... B60P 7/13 |
| 2006/0184456 | A1 | 8/2006 | De Janasz |
| 2009/0066476 | A1* | 3/2009 | Raheman ........... G07C 9/00904 |
| | | | 455/556.1 |
| 2010/0100233 | A1 | 4/2010 | Lu |
| 2012/0280783 | A1* | 11/2012 | Gerhardt ................ H04L 63/08 |
| | | | 340/5.6 |
| 2014/0180914 | A1 | 6/2014 | Abhyanker |
| 2014/0254896 | A1 | 9/2014 | Zhou |
| 2015/0006005 | A1 | 1/2015 | Yu |
| 2015/0032252 | A1 | 1/2015 | Galluzzo |
| 2015/0202770 | A1 | 7/2015 | Patron |
| 2015/0277440 | A1 | 10/2015 | Kimchi |
| 2015/0301150 | A1 | 10/2015 | Stuckman |
| 2015/0310381 | A1 | 10/2015 | Lyman |
| 2016/0016664 | A1 | 1/2016 | Basuni |
| 2016/0196755 | A1 | 7/2016 | Navot |
| 2016/0257401 | A1 | 9/2016 | Buchmueller |
| 2017/0110017 | A1 | 4/2017 | Kimchi |
| 2018/0130159 | A1 | 5/2018 | High |

OTHER PUBLICATIONS

International Search Report and Written Opinion dated Jan. 29, 2018 in corresponding PCT App. No. PCT/US2017/059829.
Loten, Angus; "Are Self-Driving Delivery Vehicles Headed Underground?"; http://blogs.wsj.com/cio/2016/03/23/areselfdrivingdeliveryvehiclesheadedunderground/; Mar. 23, 2016; pp. 1-4.
Murphy, Mike; "Google wants to deliver packages from self-driving trucks";http://qz.com/613277/google-wants-to-deliver-packages-from-self-driving-trucks/; Feb. 9, 2016; pp. 1-3.
PCT; App. No. PCT/US2017/059829; International Preliminary Report on Patentability dated May 23, 2019.
USPTO; U.S. Appl. No. 15/798,992; Notice of Allowance dated Feb. 4, 2021; (pp. 1-12).
USPTO; U.S. Appl. No. 15/798,992; Office Action dated Apr. 16, 2020; (pp. 1-57).
USPTO; U.S. Appl. No. 15/798,992; Office Action dated Jul. 25, 2019; (pp. 1-48).
USPTO; U.S. Appl. No. 15/798,992; Office Action dated Sep. 1, 2020, (pp. 1-68).
USPTO; U.S. Appl. No. 15/798,992; Office Action dated Dec. 23, 2019.

* cited by examiner

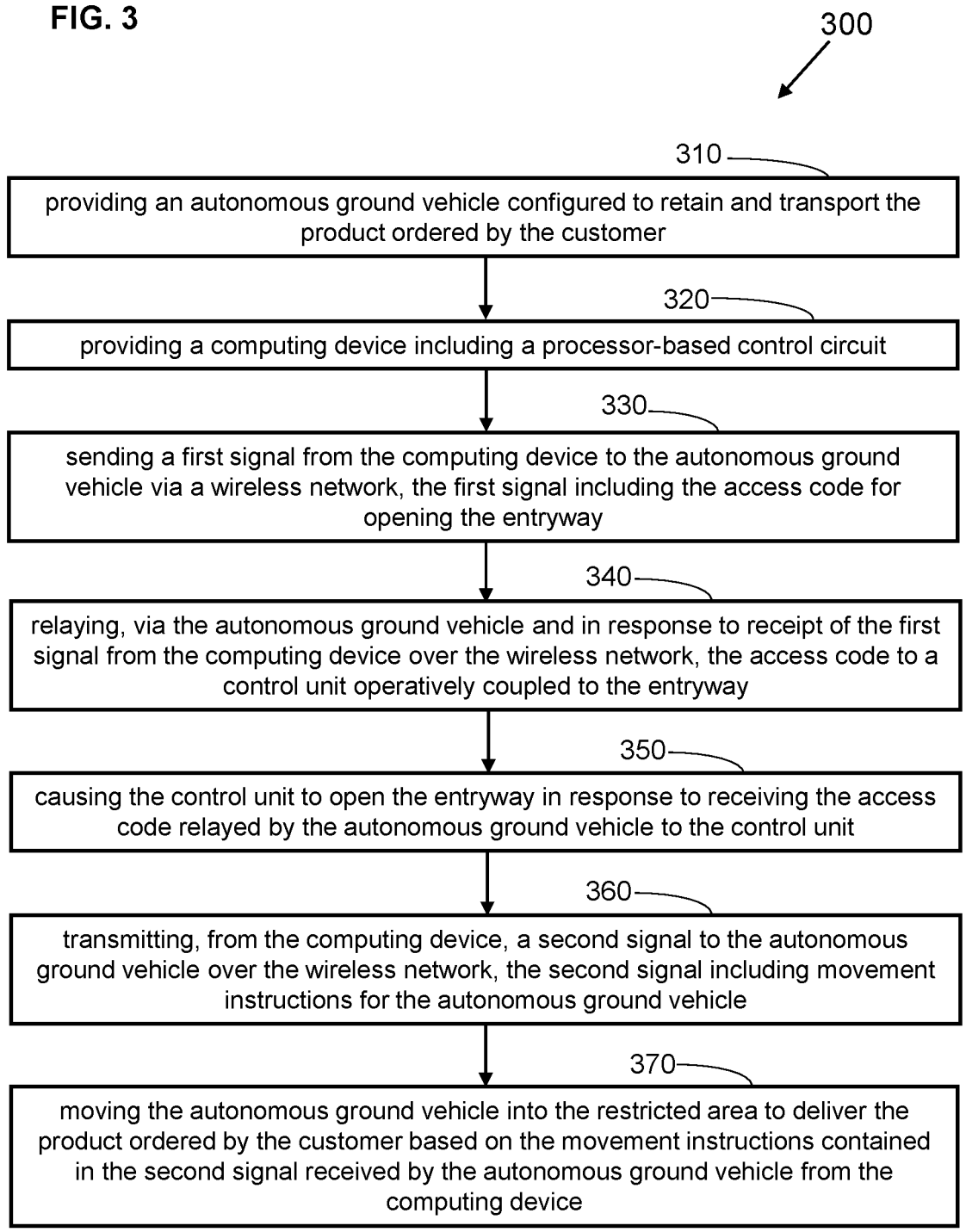

SYSTEMS AND METHODS FOR DELIVERING PRODUCTS VIA AUTONOMOUS GROUND VEHICLES TO RESTRICTED AREAS DESIGNATED BY CUSTOMERS

CROSS-REFERENCE TO RELATED APPLICATION

This application is a continuation of U.S. application Ser. No. 15/798,992, filed Oct. 31, 2017, which claims the benefit of U.S. Provisional Application No. 62/420,122, filed Nov. 10, 2016, each of which is incorporated herein by reference in its entirety.

TECHNICAL FIELD

This invention relates generally to providing purchased products to customers and, in particular, to delivering products purchased by customers via autonomous ground vehicles.

BACKGROUND

Customers often purchase products from retailers over the internet and request delivery of the products. The products purchased by a customer are most often delivered to a home where the customer lives, and are very commonly delivered at times when the customer is not home. Products delivered to a home address and left on the property of the customer when the customer is not home (e.g., at work) may be stolen and/or damaged (e.g., by people or weather) before the product is picked up by the customer. While it is not uncommon for residences to have restricted access areas protected by gates/doors where the product or products being delivered may be dropped off by the delivery service, such gates/doors typically require an access code that the delivery services do not have and thus cannot access such restricted areas.

BRIEF DESCRIPTION OF THE DRAWINGS

Disclosed herein are embodiments of systems, apparatuses, methods, and systems pertaining to facilitating delivery of a product ordered by a customer to a customer-specified restricted area accessible by an entryway openable via an access code. This description includes drawings, wherein:

FIG. 3 is a flow chart diagram of a process of facilitating delivery of a product ordered by a customer to a customer-specified restricted area accessible by an entryway openable via an access code in accordance with some embodiments.

Figure 1:
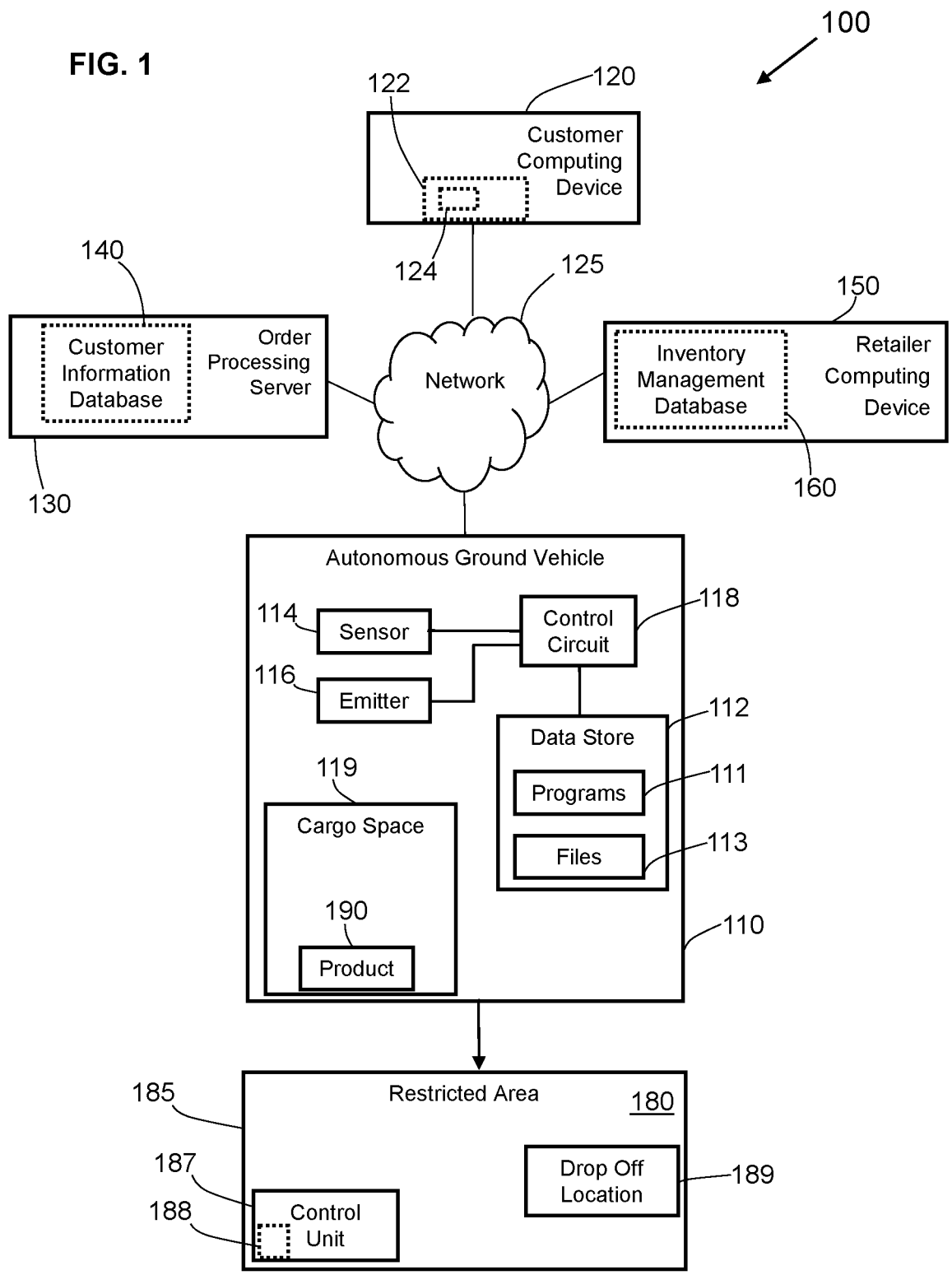
FIG. 1 is a diagram of a system for facilitating delivery of a product ordered by a customer to a customer-specified restricted area accessible by an entryway openable via an access code in accordance with some embodiments.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for delivering, via autonomous ground vehicles (AGVs) and/or unmanned aerial vehicles (UAVs), products ordered by customers to a customer-specified restricted area accessible by an entryway openable via an access code. The AGVs are provided with wireless access codes to gain access to the restricted area, where the AGVs are able to drop off products being delivered and/or pick up products being returned.

In some embodiments, a system for facilitating delivery of a product ordered by a customer to a customer-specified restricted area accessible by an entryway openable via an access code includes an autonomous ground vehicle configured to retain and transport the product ordered by the customer and a computing device including a processor-based control circuit and configured to send a first signal to the autonomous ground vehicle via a wireless network, the first signal including the access code for opening the entryway. In response to receipt of the first signal from the computing device over the wireless network, the autonomous ground vehicle is configured to relay the access code to a control unit operatively coupled to the entryway to cause the control unit to open the entryway in response to receipt of the access code from the autonomous ground vehicle. The computing device is configured to transmit a second signal to the autonomous ground vehicle over the wireless network, the second signal including movement instructions for the autonomous ground vehicle. The autonomous ground vehicle, after receipt of the second signal from the computing device over the wireless network, is configured to move into the restricted area, based on the movement instructions contained in the second signal, to deliver the product ordered by the customer.

In other embodiments, a method for facilitating delivery of a product ordered by a customer to a customer-specified restricted area accessible by an entryway openable via an access code includes providing an autonomous ground vehicle configured to retain and transport the product ordered by the customer; providing a computing device including a processor-based control circuit; sending a first signal from the computing device to the autonomous ground vehicle via a wireless network, the first signal including the access code for opening the entryway; relaying, via the autonomous ground vehicle and in response to receipt of the first signal from the computing device over the wireless network, the access code to a control unit operatively coupled to the entryway; causing the control unit to open the entryway in response to receiving the access code relayed by the autonomous ground vehicle to the control unit; transmitting, from the computing device, a second signal to the autonomous ground vehicle over the wireless network, the second signal including movement instructions for the autonomous ground vehicle; and moving the autonomous ground vehicle into the restricted area to deliver the product ordered by the customer based on the movement instructions contained in the second signal received by the autonomous ground vehicle from the computing device.

FIG. 1 shows an embodiment of a system 100 for facilitating delivery of a product 190 ordered by a customer to a customer-specified restricted area 180 accessible by an entryway 185. It will be understood that the details of this example are intended to serve in an illustrative capacity and are not necessarily intended to suggest any limitations in regards to the present teachings. The retailer may be any entity operating as a brick-and-mortar physical location and/or a website accessible, for example, via the internet or another network, by way of which products 190 may be ordered by a consumer (e.g., customer of the retailer). A customer may be an individual or business entity. Exemplary products 190 that may be ordered by the customer via the system 100 may include, but are not limited to, general-purpose customer goods and consumable products (e.g., food items, medications, or the like).

The exemplary system 100 depicted in FIG. 1 includes an order processing server 130 of the retailer configured to process a purchase order by the customer for one or more products 190. The order processing server 130 may be implemented as one server at one location, or as multiple interconnected servers stored at multiple locations operated by the retailer, or for the retailer. As described in more detail below, the order processing server 130 may communicate with one or more electronic devices of system 100 via a network 125.

The network 125 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, cellular, Wi-Fi or Bluetooth networked components or the like. In some embodiments, one or more electronic devices of system 100 may include cloud-based features, such as cloud-based memory storage.

In the embodiment of FIG. 1, the order processing server 130 is coupled to a customer information database 140. In some embodiments, the customer information database 140 may be configured to store information associated with customers of the retailer who order products 190 from the retailer. In some embodiments, the customer information database 140 may store electronic information including but not limited to: personal information of the customers, including payment method information, delivery address information and any known delivery access restrictions associated with the residence of the customer, access code(s) associated with the restricted area 180 designated for delivery by the customer, product order history, pending order status, product order options, as well as product delivery options of the customer.

The customer information database 140 may be stored, for example, on non-volatile storage media (e.g., a hard drive, flash drive, or removable optical disk) internal or external to the order processing server 130, or internal or external to computing devices separate and distinct from the order processing server 130. It will be appreciated that the customer information database 140 may likewise be cloud-based. In some embodiments, the order processing server 130 may be also coupled to an electronic database configured to store information associated with the inventory of products 190 made available by the retailer to the customer. In other words, while the order processing server 130 is illustrated in FIG. 1 as being coupled to one electronic database (i.e., customer information database 140), it will be appreciated that the order processing server 130 may be additionally coupled to an electronic database akin to the inventory management database 160 configured to store product inventory information In some embodiments, when a customer initially sets up an online account with the retailer, the system 100 (i.e., order processing server 130 or another server on the system 100 dedicated to new customer sign-up) is configured to permit the customer to generate a customer profile including personal information of the customer (e.g., name, address, phone number, and the like), payment methods (e.g., credit card information), as well as product delivery settings of the customer (e.g., preferred delivery address and/or preferred delivery method). It will be appreciated that the customer may select new options and/or update previously selected options at any time after setting up the account with the retailer. In some embodiments, the personal information of the customer and any product delivery options selected by the customer are stored in the customer information database 140 for subsequent retrieval by the order processing server 130 and/or by a retailer computing device 150 (e.g., in response to a login request by the customer, or product order placement by the customer).

The customer may access the order processing server 130 of the retailer via a customer computing device 120, which may be a stationary, portable, and/or hand-held electronic device, for example, a desktop computer, a laptop computer, a tablet, a mobile phone, or any other electronic, processor-based device that may be configured for data entry and communication with the order processing server 130 over the network 125. In some embodiments, the customer may access the order processing server 130 of the retailer via a graphical interface 122 displayed to the customer on the customer computing device 120. The graphical interface 122 may include one or more graphical input fields 124 in the form of menu options and/or sub-interfaces that permit the customer to place an order for one or more products 190 and to select a delivery option for one or more products 190 ordered by the customer. In some embodiments, the graphical interface 122 may be a retailer-associated mobile application (app) installed on the customer computing device 120 and configured to display various above-described menu options, notifications, and/or alerts for the customer. For example, electronic alerts may be transmitted to the customer computing device 120 via the network 125 from the retailer computing device 150 and/or from the order processing server 130 and displayed to the customer via the graphical interface 122.

In some embodiments, as the customer is attempting to connect (e.g., via the customer's computing device 120 such as a cell phone) to the retailer's website, the order processing server 130 may request a verification of the identity (e.g., username/password) of the customer. The order processing server 130 may first verify the identity of the customer (e.g., by comparing the username/password data entered by the customer into the login interface against username/password data in the profile of the customer stored in the customer information database 140). The order processing server 130 may then associate the customer profile with the identity of the customer, retrieve the customer profile from the customer information database 140 based on information stored in the profile, and send the retrieved customer account information to the customer computing device 120, which includes a graphical interface 122 including one or more input fields 124 that permit the customer to customize various options relating to the ordering of products 190 from the retailer and/or the delivering of the ordered products 190 to the customer.

In some embodiments, after placing an on order for one or more products 190 via the order processing server 130 using the graphical interface 122 of the customer computing device 120, the customer can specify that the product 190 ordered by the customer is to be delivered to a customer-designated restricted area 180 accessible by an entryway 185 openable by way of an access code. Generally, the restricted area 180 may be generally any area or structure that is accessible via a gate, door, or the like, that require being opened (e.g., via an access code) in order to gain access to the restricted area 180. For example, the restricted area 180 accessible by an entryway 185 that may be specified by the customer when placing the order may be a garage (having an access code-openable entryway in the form of a garage door), a front yard (having an access code-openable entryway in the form of a gate), a side entry walkway (having an access code-openable entryway in the form of a gate), a patio (having an access code-openable entryway in the form of a gate or door), a porch (having an access code-openable gate entryway in the form of a or door), a secure product storage lockers (or another product storage receptacle) having an access code-openable door, or the like. at or near the residence of the customer.

In some embodiments, the order processing server 130 is configured to receive and process an order by a customer for a product 190 from the customer computing device 120, to receive and process payment for the product 190 from the customer, and to transmit (e.g., to the retailer computing device 150 via the network 125) the customer's selection of an option to have the ordered products 190 delivered to a customer-designated restricted area 180 accessible by an entryway 185 openable by way of an access code. It will be appreciated that while the order processing server 130 and the retailer computing device 150 may be located at separate physical locations (e.g., regional/central data center, product distribution center, retail store, or the like), the retailer computing device 150 and the order processing server 130 of the system 100, in some embodiments, may be confined to a single facility.

The retailer computing device 150 may be a stationary or portable electronic device, for example, a desktop computer, a laptop computer, a tablet, a mobile phone, or any other electronic device including a processor-based control circuit (i.e., control unit). For purposes of this specification, the term "retailer computing device" will be understood to refer to a computing device owned by the retailer or any computing device owned and/or operated by an entity (e.g., manufacturer, delivery service, worker of the retailer) having an obligation to deliver products 190 to or for the retailer. In the embodiment of FIG. 1, the retailer computing device 150 is configured for data entry and processing as well as for communication with other devices of system 100 via the network 125 which, as described above. In some embodiments, as will be described below, the retailer computing device 150 is configured to access one or more of the inventory management database 160 and customer information database 140 via the network 125 to facilitate delivery of the products 190 ordered by a customer to a restricted area 180 designated for delivery.

In the exemplary system 100 of FIG. 1, the retailer computing device 150 is in two-way communication with the AGV 110 via the network 125. For example, the retailer computing device 150 is configured, in some approaches, to transmit at least one signal to the AGV 110 to cause the AGV 110 to move toward and/or away from the restricted area 180 in order to transport, pick up, and/or drop off the product or products 190 ordered by the customer. In some embodiments, the retailer computing device 150 is configured to cause the UAV 110 to travel to the restricted area 180 designated by the customer, locate the restricted area 180, cause the AGV 110 to wait a predetermined time at the restricted area 180, and permit the customer to retrieve the products 190 from the AGV 110, for example, after verification of the customer's identity by the AGV 110 (or by the retailer computing device 150). In some embodiments, as will be described in more detail below, the retailer computing device 150 may be configured to determine whether one or more product pick/up and/or drop off conditions for the AGV 110 are met prior to instructing the AGV 110 to move into a product unloading position in the restricted area 180 and drop off a product 190 from the cargo space 119 of the AGV 110 in the restricted area 180, permitting the customer to retrieve the product 190 delivered by the AGV 110.

In some embodiments, the retailer computing device 150 is configured to obtain GPS coordinates of the restricted area 180 and to obtain GPS coordinates of a physical location of the AGV 110. In one approach, the control circuit 210 (see FIG. 2) of the retailer computing device 150 is configured, based on an analysis of the obtained GPS coordinates of the restricted area 180 and of the physical location of the AGV 110, to determine a route for the AGV 110 toward the entryway 185 and into the restricted area 180 and to the drop-off location 189 to deliver the product 190 ordered by the customer. It will be appreciated that instead or in addition to the GPS coordinates, the retailer computing device 150 may obtain a street address associated with the restricted area 180 and determine the route of the AGV 110 based on a known street address of the restricted area 180. The control circuit 210 of the retailer computing device 150 is also programmed to generate and transmit a signal including the route to the AGV 110 such that the movement of the AGV 110 is guided via the route determined by the control circuit 210.

The AGV 110 is generally a vehicle configured to autonomously traverse one or more intended environments in accordance with one or more routes and/or determined paths, and typically without the intervention of a human or a remote computing device, while retaining the products 190 therein and delivering the products 190 and/or to perform one or more tasks. Such a vehicle may be. an autonomous ground vehicle (AGV), an unmanned aerial vehicle (UAV or drone), or the like. In some instances, however, a remote operator or a remote computer (e.g., retailer computing device 150) may temporarily or permanently take over operation of the AGV 110 using feedback information from the AGV 110 (e.g., audio and/or video content, sensor information, etc.) communicated to a remote navigation center and/or central control system (e.g., via network 125 or other similar distributed network).

The exemplary AGV 110 of FIG. 1 includes one or more data stores 112, sensors 114, and emitters 116 each in communication with one or more control circuits 118. In some embodiments, emitter 116 and sensor 114 are implemented together through a single device. The AGV 110 deployed in some embodiments of the exemplary system 100 does not require physical operation by a human operator and wirelessly communicates with, and is wholly or largely controlled by, the retailer computing device 150. For example, the retailer computing device 150 may control directional movement of the AGV 110 to the restricted area 180 based on a variety of inputs. In some approaches, the control circuit 118 of the AGV 110 is programmed with global positioning system (GPS) coordinates of a restricted area 180 where the products 190 are to be delivered, and is configured to determine a route of the AGV 110 to the restricted area 180 and to cause the AGV 110 to move toward the restricted area 180 without receiving remote signals (e.g., route instructions) from the retailer computing device 150.

In some embodiments, the emitter 116 is configured as a two-way transceiver that can receive the movement instructions (i.e., route instructions) in a signal transmitted over the network 125 from the retailer computing device 150, and that can send one or more signals to the retailer computing device 150, or to an access control unit 187 operatively coupled to the entryway 185 and configured to open the entryway 185 of the restricted area 180 upon receiving the correct access code. In some embodiments, the access control unit 187 is operatively coupled to a transceiver 188 configured to transmit the GPS coordinates of the restricted area 180 over the network 125. In some configurations, the transceiver 188 is configured to transmit the GPS coordinates of the restricted area 180 to the customer information database 140 such that the GPS coordinates of the restricted area 180 can be stored in the customer information database 140 in association with the customer for later retrieval (e.g., by the retailer computing device 150). In some configurations, the transceiver 188 is configured to transmit the GPS coordinates of the restricted area 180 directly to the retailer computing device 150 such that the retailer computing device 150 obtains the GPS coordinates of the restricted area 180 based on the GPS coordinates transmitted by the transceiver 188 directly to the computing device.

In some embodiments, the retailer computing device 150 determines an optimal travel route for the AGV 110 from the origin of travel (e.g., a deployment station) of the AGV 110 to the destination (e.g., entryway 185 to the restricted area 180 or drop off location 189 in the restricted area 180) of the AGV 110. In some aspects, the retailer computing device 150 calculates multiple possible optimum routes. In some embodiments, the system 100 integrates 2D and 3D maps of the navigable space of the AGV 110 with physical locations of objects (e.g., trees, cars, houses, or the like) located between the deployment location of the AGV 110 and the destination location of the AGV 110. The 2D and 3D maps of relevant geographic locations may be downloaded in real-time or pre-stored in the customer information database 140. In one approach, after the retailer computing device 150 maps all objects to specific locations using algorithms, measurements and global position system (GPS) geo-location, the grids may be applied sectioning off the maps into access ways and blocked sections, enabling the AGV 110 use such grids for navigation and recognition. The grids may be applied to 2D horizontal maps along with 3D models. Such grids may start at a higher unit level and then can be broken down into smaller units of measure by the retailer computing device 150 when needed to provide more accuracy.

In some embodiments, the retailer computing device 150 is configured to analyze GPS coordinates of the restricted area 180 designated by the customer, to determine an optimal route for the AGV 110 to the restricted area 180, and to transmit to the AGV 110 a signal over the network 125 including route instructions to guide the AGV 110 to the restricted area 180 along the determined route. In turn, the AGV 110, upon receipt of such a signal from the retailer computing device 150, is configured to navigate, based on the route instructions, to the restricted area 180 while retaining the products 190 ordered by the customer therein, and to navigate within the restricted area 180 after the entryway 185 is opened in order to drop off the product at the drop off location 189. It will be appreciated that the route instructions, after being determined by the retailer computing device 150, can be recalculated by the control circuit 210 of the retailer computing device 150 in real-time, for example, if an obstacle or another movement restriction is detected along the originally calculated route of the AGV 110, or if the customer updates the delivery location to another restricted area 180 designated by the customer.

While only AGV 110 is shown in FIG. 1 for ease of illustration, it will be appreciated that in some embodiments, the system 100 may include any number of AGVs 110 and the retailer computing device 150 may simultaneously communicate with and/or transmit route instructions to more than one (e.g., 5, 10, 50, 100, 1000, or more) AGVs 110 simultaneously to guide the AGVs 110 along the routes determined by the retailer computing device 150 in order to transport products 190 to their respective delivery destinations (e.g., restricted areas 180). Similarly, while only one restricted area 180 is depicted in FIG. 1 for ease of illustration, it will be appreciated that in some embodiments, one or more AGVs 110 of the system 100 may be simultaneously guided by one or more retailer computing devices 150 to deliver products 190 to more than one (e.g., 5, 10, 50, 100, 1000, or more) different restricted areas 180. As described above, the AGV 110, after receiving a signal including the route instructions from the retailer computing device 150 over the network 125, navigates to the location of the restricted area 180 based on the route instructions while retaining the products 190 ordered by the customer therein.

In some embodiments, when the AGV 110 moves to within a predetermined distance (e.g., 3 feet, 6 feet, 10 feet, 15 feet, 20 feet, etc.) from the access control unit 187, the control circuit 118 of the AGV 110 is programmed to cause the emitter 116 of the AGV 110 to transmit, via the network 125, a signal including an electronic confirmation that the product 190 ordered by the customer has been delivered by the AGV 110 to the entry way 185 at the restricted area 180 designated by the customer. In one approach, in response to receipt of such an electronic confirmation from the AGV 110, the computing device 150 is configured to transmit to the AGV 110 a signal including an access code for opening the entryway 185. In some embodiments, in response to receipt of the signal including the access code from the retailer computing device 150 over the wireless network 125, the AGV 110 is configured to relay (e.g., via the emitter 116) the access code to an access control unit 187 operatively coupled to the entryway 185. In other words, in some aspects, the emitter 116 of the AGV 110 is configured to receive the signal including the access code from the retailer computing device 150 over the wireless network 125 and to relay the access code to the access control unit 187 operatively coupled to the entryway 185. In some embodiments, the emitter 116 of the AGV 110 is configured for one or two way communication with the transceiver 188 when the AGV 110 is located within a predetermined distance (e.g., 3 feet, 6 feet, 10 feet, 15 feet, 20 feet, etc.) of the transceiver 188.

As such, the AGV 110 advantageously does not have to store the access code in the data store 112, which both reduces the data storage requirements of the AGV 110 and improves the security of the system 100 in that the access code to the restricted area 180 of the customer's home is only permanently stored in the customer information database 140 at a secure facility and not stored on an AGV 110, which moves around public streets and may become a theft target by hostile third parties. In response to receipt of the access code relayed by the AGV 110, the access control unit 187 causes the entryway 185 to open, thereby enabling the AGV 110 to enter the restricted area 180. In some embodiments, the control circuit 118 of the AGV 110 is configured to generate, and the emitter 116 of the AGV 110 is configured to transmit, via the network 125, a signal including an electronic confirmation that the AGV 110 successfully entered the restricted area 180 via the entry way 185.

In some approaches, in response to receipt from the AGV 110 of the electronic confirmation that the AGV 110 successfully entered the restricted area 180 via the entryway 185, the retailer computing device 150 is configured to transmit to the AGV 110 a signal over the wireless network 125 including movement instructions for the AGV 110 while in the restricted area 180. In one approach, the retailer computing device 150 is also configured to again transmit the access code to the AGV 110 to enable the AGV 110 to again relay the access code to the access control unit 187 in order to close the entryway 185 while the AGV 110 is present in the restricted area 180, thereby advantageously enhancing the security of the restricted area 180 while the AGV 110 is moving within the restricted area 180. In some approaches, the route (i.e., movement) instructions for the AGV 110 while in the restricted area 180 are transmitted to the AGV 110 prior to the AGV 110 entering the restricted area 180 and/or prior to arriving at the entry way 185 to the restricted area 180. For example, the route (i.e., movement) instructions for the AGV 110 may be transmitted by to the AGV 110 by the retailer computing device 150 after the product 190 is loaded into the AGV 110 and prior to commencement of the delivery of the product 190 by the AGV 110.

In some configurations, based on the route instructions or a separate signal received from the retailer computing device 150, the AGV 110 is configured to move into and within the restricted area 180 and deliver the product 190 ordered by the customer to a product drop off location 189 in the restricted area 180. In some configurations, based on the route instructions or a separate signal received from the retailer computing device 150, the AGV 110 is configured to remain proximate the product drop off location 189 while retaining the product 190 ordered by the customer therein for a period of time indicated in the route instructions or separate control signal. In some configurations, based on the route instructions or a separate signal received from the retailer computing device 150, the AGV 110 is configured to drop the product 190 off (i.e., release the product from the cargo space 119) at the product drop off location 189. While reference numeral 189 in FIG. 1 is referred to as a drop off location, it will be appreciated that in some embodiments, the AGV 110 is configured to pick up one or more products 190 (e.g. return products) from the drop off location 189, for example, after dropping off one or more products 190 at the drop off location 189, or without having to drop off the products at the drop off location 189.

In some embodiments, when the AGV 110 moves into position to drop off the product 190 or to release the product 190 to the customer at the drop off location 189, the control circuit 118 of the AGV 110 is programmed to cause the emitter 116 of the AGV 110 to transmit, via the network 125, a signal including an electronic confirmation that the product 190 ordered by the customer has been delivered by the AGV 110 to the drop off location 189 in the restricted area 180. In one approach, in response to receipt from the AGV 110 of such an electronic delivery confirmation, the computing device 150 is configured to transmit to the customer computing device 120 an electronic alert that the product 190 ordered by the customer has been delivered to the drop off location 189. In situations when the customer is home, the customer may come out to the drop off location 189 after receiving such an electronic delivery confirmation in order to attempt to either retrieve the product 190 from the cargo space 119 of the AGV 110, or from an exposed surface of the drop off location 189.

In some embodiments, one or more product drop stations may be provided in the restricted area 180 in order to enable the AGV 110 to drop off the product 190 in a specifically designated place. In one approach, such product drop stations may be in the form of secure lockers such that the product remains secured and may be accessed only by the customer even after the AGV 110 drops the product off in the restricted area 180 (e.g., a garage). In one approach, the product drop stations may include one or more charge ports where the AGV 110 may be recharged.

In some embodiments, the AGV 110 is configured to, in response to either a control signal from the retailer computing device 150, or a verification code entered by the customer, to permit the customer to retrieve the products 190 ordered by the customer from the interior cargo space of the AGV 110. According to some embodiments, the emitter 116 of the AGV 110 is also configured to transmit, via the network 125, a signal including an electronic confirmation that the product 190 ordered by the customer has been retrieved by the customer from the AGV 110 at the drop off location 189 of the restricted area 180. In some approaches, in response to receipt of such an electronic confirmation from the AGV 110, the retailer computing device 150 is configured to transmit return route instructions to the AGV 110 to guide the AGV 110 back to a deployment station of the AGV 110, or to another restricted area 180 of another customer designated as a delivery location for another product 190 stored in the AGV 110.

In some embodiments, the control circuit 118 is configured to generate and the emitter 116 of the AGV 110 is configured to transmit, via the network 125, a signal including an electronic confirmation that the AGV has moved a predetermined distance (e.g., 3 feet, 6 feet, 10 feet, 15 feet, 20 feet, etc.) out of the restricted area 180 after having successfully delivered the product 190 at the drop off location 189. In some approaches, in response to receipt of such an electronic confirmation from the AGV 110, the retailer computing device 150 is configured to transmit a signal including the access code for closing the entryway 185, which may be the same as, or different from the access code for opening the entryway 185. In some embodiments, in response to receipt of the signal including the access code from the retailer computing device 150 over the wireless network 125, the AGV 110 is configured to relay (e.g., via the emitter 116) the access code to the access control unit 187 operatively coupled to the entryway 185 in order to enable the access control unit 187 to close the entryway 185 and thereby prevent unauthorized access to the restricted area 180. In one approach, after the AGV 110 relays the access code to the access control unit 187 in order to close the entryway 185, the AGV 110 is configured to confirm that the entryway 185 actually closes, for example, by activating (via the control circuit 118) the sensor 114, which may be a video camera that visually confirms closure of the entryway 185. In one configuration, if the sensor 114 indicates that the entryway 185 has not closed, the control circuit 118 of the AGV 110 is programmed to cause the AGV 110 to return to the drop off location 189 in order to guard the product 190 left in the drop off location 189 (e.g., to prevent theft).

In some embodiments, the AGV 110 includes one or more propulsion systems (e.g., motors, wheels, tank treads, etc.) that enable the AGV 110 to at least accelerate, deaccelerate, and/or traverse an environment using a navigation coordinate system, such as GPS, coordinate mapping information, beacon location information, cellular signal triangulation, other navigation systems and/or information, or a combination of two or more of such navigation systems and/or information. Further, the navigation coordinate system can be configured to provide location information, and in some instances time information. In some embodiments, the AGV 110 is configured to operate in different weather conditions, and/or can be readily modified depending on expected weather conditions (e.g., wheels replaced with tank treads when it is anticipated that the AGV 110 may encounter snow and/or ice). The AGV 110 can, in some applications, be further configured to communicate with other AGVs, other autonomous vehicles (e.g., unmanned aerial vehicles (UAVs)), transport vehicles, multiple different types of computing devices, a remote central control system, other computing devices, remote databases, and/or other such devices.

In some embodiments, the emitter 116 of the AGV 110 is a wired or a wireless transceiver configured to convey information, notifications, warnings and/or deterrents to a customer, a worker of the retailer, a potential threat (e.g., animal, person that is a potential threat), unknown third party, a remote central control system, a security service, a municipal police service, other such entities, or combination of two or more of such entities. The emitter 116 can comprise one or more output devices (e.g., speakers, displays, whistles, buzzers, lights and similar items) that convey text, audio, and/or visual signals. In some embodiments, emitter 116 can be configured to convey notifications having textual, audible and/or visual content. Similarly, the emitter 116 may additionally or alternatively be configured to facilitate wireless data communications with a computing device, including but not limited to, retailer computing device 150.

In some embodiments, the emitter 116 may be configured to emit one or more irritants. For example, an "irritant" can include one or more stimuli or agents that can cause a "hostile" person, animal, or the like to not touch or tamper with the AGV 110 and/or to remove themselves from a predetermined perimeter about the AGV 110. Applicable irritants can include chemical, audible, visual irritants, or combination of two or more such irritants. In some embodiments, the emitter 116 can comprise one or more reservoirs, pumps, nozzles, motors, compressed gas, etc. that can be used to eject and/or adjust the direction of emission of the irritant. Additionally or alternatively, the output devices of the emitter 116 may include one or more speakers, whistles, buzzers, and the like that can be activated to generate one or more warnings (e.g., that may gradually increase in volume) audible irritants, and/or deterrent noises. Audible irritants can be substantially any relevant audible noise that can provide an alert, warn and/or deter interaction with the AGV 110. For example, audible irritants can include audible sounds within a frequency range of about 2 kHz to about 5 kHz, canine-specific audible sounds, sounds having a volume greater than one or more thresholds, audible alerts that can be understood by a person, and/or other such audible alerts and/or irritants.

In some instances, one or more emitters 116 enable the AGV 110 to progressively escalate the deterrent effect of the deterrent and/or irritant. For example, the AGV 110 may initiate the generation of an audible alert when a human, animal, automobile, or the like is detected within a first threshold distance (which may depend on a speed at which the animal, person, automobile, etc. is approaching), increase the volume of the audible alert when within a second threshold distances (less than the first threshold distance), spray one or more streams of water when within a third threshold distance (less than the second distance), and spray prepper spray when within a fourth threshold distance for more than a threshold period of time and/or contacts the AGV 110.

The exemplary AGV 110 further includes one or more sensors 114. The sensors 114 can include substantially any relevant device that provides information to the AGV 110 to be used in navigation, customer detection, potential threat detection, distance measurements, environment mapping, location determination, and/or other such sensor information. In some embodiments, the sensor 114 includes one or more devices that can be used to capture data related to one or more objects located within a threshold distance relative to the AGV 110. For example, the AGV 110 includes at least one sensor 114 configured to detect at least one obstacle between the AGV 110 and the restricted area 180 or in the restricted area 180 between the AGV 110 and the drop off location 189 along the route determined by the retailer computing device 150 for the AGV 110. Based on the detection of one or more obstacles by such a sensor 114, the AGV 110 is configured to avoid the obstacle(s).

In some embodiments, one or more sensors 114 can be included and/or cooperated with the AGV 110 that include, but are not limited to, one or more sensors to detect an object within one or more threshold or predetermined distances of the AGV 110, capture data within a threshold distance relative to AGV 110, detect movement, measure temperature, capture images and/or video, capture thermographic, infrared, and/or multi spectral images, capture images of entities attempting to tamper with AGV 110, one or more accelerometers, one or more gyroscopes, one or more odometers, one or more location sensors, one or more microphones (e.g., which can be configured to capture audible authentication codes and/or voice prints, threatening language, verbal input from customers, verbal inquiries from customers, etc.), one or more distance measurement sensors (e.g., laser sensors, sonar sensors, sensors that measure distance by emitting and capturing a wireless signal (which can comprise light and/or sound) etc.), 3D scanning sensors, other such sensors, or a combination of two or more of such sensors.

In some aspects, the AGV 110 includes one or more sensors 114 in communication with one or more access panels of AGV 110 and/or positioned adjacent to such access panels to sense when such panels are tampered with. In some aspects, the AGV 110 includes one or more sensors configured to detect the temperature in the cargo space 119 of the AGV 110 and coupled to one or more controllers configured to raise or lower the temperature of the cargo space 119 of the AGV 110 in order to preserve the freshness of the product 190 or to bring the product 190 to an appropriate consumption temperature. More generally, in some embodiments, package detection and tracking may include elements including but not limited to ambient temperature of the cargo space 119, temperature of the product 190, acceptable thresholds for temperature of the product 190, or a combination thereof.

In some embodiments, the AGV 110 includes a sensor 114 configured to detect a combination of numbers indicating a street address associated with the restricted area 180 designated as a delivery location by the customer. For example, the emitter 116 AGV 110 can be configured to transmit sensor data including the combination of letters detected by the sensor 114 on the curb in front of the house of which the garage is the restricted area 180 being delivered to, enabling the retailer computing device 150 to authenticate the restricted area 180 based on the received sensor data and the customer address information stored in the customer information database 140.

In some embodiments, the system 100 may include an access encryption system comprising a blockchain that may include authentication-based access and encryption to enables the AGV 110 to access the restricted area and/or to track and authenticate the AGV 110 and/or the products 190 being delivered by the AGV 110 to the restricted area 180. For example, when a customer (e.g., in the restricted area 180) interacts with a product 190, the customer is permitted to do so via a private or public authentication key. In response, new blocks may be added to subsequent root blocks, which will contain information relating to the date and time a product 190 delivered by the AGV 110 was accessed, as well as the authentication key that accessed the product 190. In some embodiments, authentication and access may be restricted to specific blockchain authentication keys that enable access of the AGV 110 to the restricted area 180 and/or the customer to access the contents of an AGV 110. In some aspects, access to the products in the AGV 110 may be determined at the scheduling and purchase of a delivery or products and in other aspects, access may be determined while a product 190 is moved through the supply chain and/or when the product 190 is delivered by the AGV 110 to the drop off location 189. In some embodiments, temporary authentication keys may be provide to a customer to grant temporary access to an AGV 110 or a specific storage compartment of the cargo space 119 of the AGV 110.

In some embodiments, one or more data stores 112 provide an information repository that typically stores programs 111 and files 113. The AGV 110 may, in some embodiments, further access one or more programs 111, files 113, and/or other relevant information external to AGV 110 and accessible via network 125. Files 113 can comprise information transmitted by the retailer computing device 150, data captured by the sensor 114, customer information, customer identifier information, computing device identifier information, product information, customer order information, navigation and/or routing information, location information, mapping information, AGV identifier information, communication procedures, threat information, sensor data, images, video, historic information, and/or other such information, and/or other such information. For example, in some embodiments, files 113 can further comprise one or more notification templates, which are software used by the AGVs 110 as a basis to convey salutations and/or advertisements to customers and/or pedestrians located within a threshold distance relative to the AGVs 110. Notification template's content may at least be provided by product manufacturers and/or owners of the AGVs 110. In some embodiments, notification templates may further be personalized using customer's specific information to, for example, target a specific customer and increase engagement between the customer and the AGV 110.

Personalized notifications can reference customer history, current needs, anticipated needs, and/or similar information that can increase the probability that customers make desired product and/or service purchases. Commercial product information and/or customer specific information may be added to notification templates in real-time prior to their transmission by the AGVs 110 when the presence of customers and/or pedestrians is detected by the AGV 110.

Commercial product information can include, for example, product names, product types, manufacturer names, manufacturer origin, ingredient names, ingredient types, component names, and/or component types. Notification templates can comprise audio and/or visual components, for example, music, speech, tones, images, and/or video. Files 113 can further comprise personal and/or non-public information about the customers, including but not limited to, information about browser history, location, birthdays, delivery dates, spouses, pets, and/or heirs associated with the customers. Files 113 can comprise predetermined biometric data associated with the customers, which can be used for authentication purposes, and/or determining unknown and/or hostile third parties. Applicable biometric data can include, but is not limited to voice prints, iris patterns, retina-patterns, hand geometries, earlobe geometries, facial landmarks, thermographic signatures, vascular patterns, skin texture data points, and/or walking gate data points. Predetermined biometric data can include data captured by the sensors 114, provided by the customers, external sensors, and/or received from an external central computing system.

As described above, the AGV 110 further includes programs 111 that are stored in the data store 112 and/or other memory, and utilized at least by the one or more control circuits 118. In some applications, one or more of the programs 111 are software that are executed by the one or more control circuits 118 to facilitate the operation, control, commercial activity, interaction with customers, deterring potential danger and the like to the AGV 110. For example, the one or more control circuits 118, in executing one or more programs 111, can use data generated by sensors 114 to detect when customers or hostile third parties are positioned within a threshold distance relative to the AGVs 110, generate notifications in response to detecting the presence of customers and/or hostile third parties, as well as generate notifications in response to receiving triggering events from the retailer computing device 150. For example, the presence of customers positioned within threshold distances relative to AGVs 110 can be confirmed using geolocation data, which reflects the locations of the customers, received from the retailer computing device 150 (e.g., based on GPS data obtained from the customer computing device 120).

Hostile third parties can refer to any human or animal or autonomous vehicle attempting to interfere with the operation of AGV 110, which may, for example, be characterized as any attempts to gain unauthorized access to the cargo space 119 of the AGV 110, attempts to gain unauthorized access to the AGV 110 software and/or hardware, attempts to gain unauthorized access to products 190 being transported by the AGV 110, attempt to damage the AGV 110, attempts to obstruct the travel path of AGV 110, and/or other activities that may be detrimental to the AGV 110, and/or interfere with the AGV 110.

Additionally or alternatively, control circuit 118, in executing one or more programs 111, can generate one or more types of biometric data (discussed above) using information captured via sensor 114, and determine whether the generated biometric data has one or more threshold relationships to predetermined biometric data included in files 113, wherein generated biometric data having threshold relationships identify customers and such data lacking the threshold relationships identify unknown and/or hostile third parties.

Figure 2:
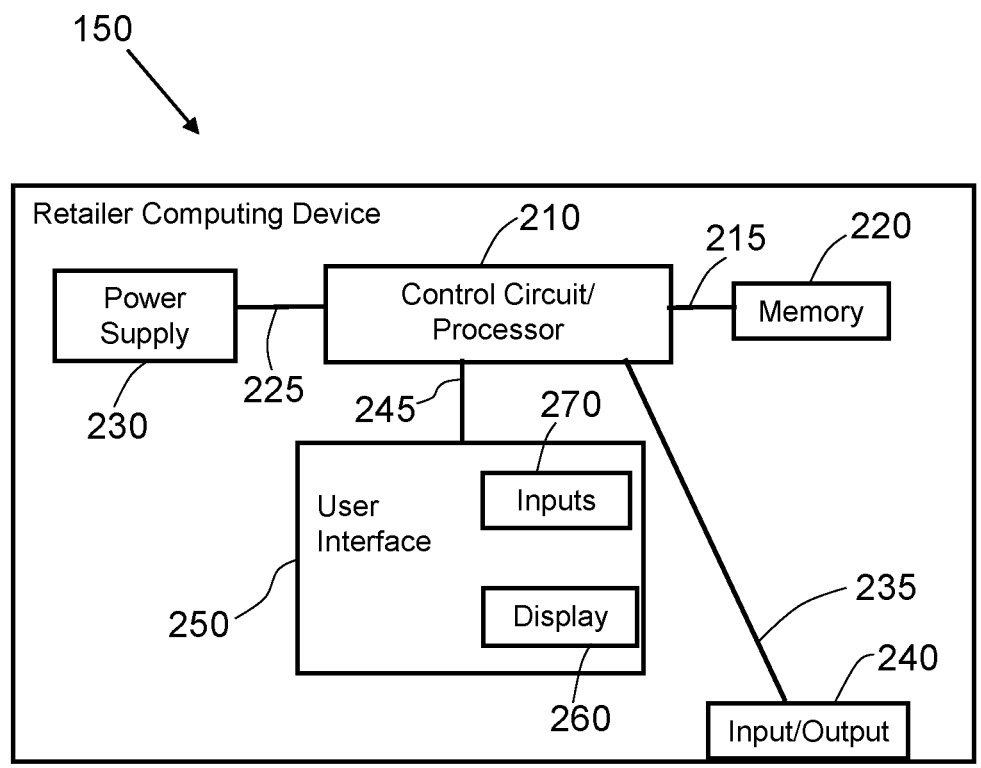
FIG. 2 is a functional diagram of an exemplary retailer computing device usable with the system of FIG. 1 in accordance with some embodiments.

With reference to FIG. 2, an exemplary retailer computing device 150 configured for use with the systems and methods described herein may include a control circuit or control circuit 210 including a processor (for example, a microprocessor or a microcontroller) electrically coupled via a connection 215 to a memory 220 and via a connection 225 to a power supply 230. The control circuit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 210 of the retailer computing device 150 can be configured (for example, by using corresponding programming stored in the memory 220 as will be well understood by those skilled in the art) to carry out one or more of the steps, actions, and/or functions described herein. In some embodiments, the memory 220 may be integral to the processor-based control circuit 210 or can be physically discrete (in whole or in part) from the control circuit 210 and is configured non-transitorily store the computer instructions that, when executed by the control circuit 210, cause the control circuit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control circuit 210 of the retailer computing device 150 is also electrically coupled via a connection 235 to an input/output 240 that can receive signals from the order processing server 130 (e.g., data from the customer information database 140 relating to an order for a product 190 placed by the customer and/or information (e.g., GPS coordinates) associated with a physical location (e.g., GPS coordinates or street address) of the restricted area 180 selected by the customer), or from any other source that can communicate with the retailer computing device 150 via a wired or wireless connection. The input/output 240 of the retailer computing device 150 can also send signals to the order processing server 130 (e.g., electronic notification confirming retrieval of the product 190 by the customer from the AGV 110), or to any other device in wired or wireless communication with the retailer computing device 150.

In the embodiment shown in FIG. 2, the processor-based control circuit 210 of the retailer computing device 150 is electrically coupled via a connection 245 to a user interface 250, which may include a visual display or display screen 260 (e.g., LED screen) and/or button input 270 that provide the user interface 250 with the ability to permit an operator of the retailer computing device 150 to manually control the retailer computing device 150 by inputting commands via touch-screen and/or button operation and/or voice commands to, for example, to communicate with the customer computing device 120 and/or an AGV 110. It will be appreciated that the performance of such functions by the processor-based control circuit 210 of the retailer computing device 150 is not dependent on a human operator, and that the control circuit 210 may be programmed to perform such functions without a human operator.

In some embodiments, the display screen 260 of retailer computing device 150 is configured to display various graphical interface-based menus, options, and/or alerts that may be transmitted to the retailer computing device 150 and displayed on the display screen 260 in connection with various aspects of the order placed by the customer. The inputs 270 of the retailer computing device 150 may be configured to permit an operator to navigate through the on-screen menus on the retailer computing device 150 and make changes and/or updates to the route instructions for the AGV 110 during delivery of the product 190 to the restricted area 180. It will be appreciated that the display screen 260 may be configured as both a display screen and an input 270 (e.g., a touch-screen that permits an operator to press on the display screen 260 to enter text and/or execute commands.)

In some embodiments, the control circuit 210 of the retailer computing device 150 is programmed to determine that one or more products 190 ordered by the customer via the order processing server 130 is to be delivered to a restricted area 180 having an access code controlled entryway 185. For example, when the customer places an order for one or more products 190 via the processing server 130, the customer is provided with an input field 124 on the graphical interface 122 of the customer computing device 120 prompting the customer to select a delivery option, with one of the available options being delivery of the product 190 to a restricted area 180 (e.g., a garage, front yard, side entry, etc.) designated by the customer. In some embodiments, the control circuit 210 of the retailer computing device 150 is programmed to authorize commencement of a delivery attempt of the product 190 to the customer after verification that physical location of the restricted area 180 has been identified.

In one aspect, prior to, or after the commencement of the delivery attempt of one or more products 190 to the restricted area 180 designated for delivery by the customer, the control circuit 210 of the retailer computing device 150 is programmed to receive and/or otherwise obtain the physical location of the restricted area 180. For example, in a situation where the customer requested delivery of the products 190 to a garage at a residence of the customer, the control circuit 210 may obtain the street address of the customer and/or GPS coordinates and/or other location identifiers associated with the garage at the customer's residence from the customer information database 140 or, in one aspect, directly from the transceiver 188 located in the customer's garage.

In some embodiments, when the delivery of the product 190 via the AGV 110 is in progress, and more specifically, after the AGV 110 has arrived at the entryway 185 to the restricted area 180, the control circuit 210 is configured to receive, via the network 125, an authentication of the identity of the restricted area 180. In one aspect, the sensor 114 of the AGV 110 may include a video camera configured to visually detect the customer's street address (e.g., by detecting the numbers on a curb or on the house of the customer) and/or visually detect the garage door itself (e.g., snap a still photo of the garage door) and generate identity detection data. The emitter 116 of the AGV 110 may then transmit such identity detection data over the network 125 to the retailer computing device 150, after which the control circuit 210 of the retailer computing device 150 is configured to obtain (e.g., from the customer information database 140) authentic identification data associated with the restricted area 180 to determine whether there is a match. In one approach, if the identity detection data associated with the restricted area 180 transmitted by the emitter 116 matched the authentic identification data stored in the customer information database 140, the control circuit 210 of the retailer computing device 150 is programmed to send (via the input/output 240) to the AGV 110 a signal including an access code that, when relayed by the AGV 110, causes the access control unit 187 to open the entryway 185. In one approach, the access code to the access control unit 187 is not transmitted to the AGV 110 directly from the retailer computing device 150, but is transmitted to the AGV 110 directly from customer information database 140. In one aspect, upon a successful relay of the access code by the AGV 110 to the access control unit 187 and successful opening of the entryway 185 (which is confirmed by sensor 114 of the AGV 110), the AGV 110 is configured to transmit, and the control circuit is 210 of the retailer computing device 150 is configured to receive, over the network 125, an electronic confirmation that the AGV 110 has been successfully granted access into the restricted area 180.

In some embodiments, the control circuit 210 of the retailer computing device 150 is programmed to generate customer alerts in connection with the delivery of the products 190 to the drop off location 189 at the restricted area 180. The customer alerts may be generated by the retailer computing device 150 based on information received from the AGV 110. In the embodiment shown in FIG. 1, the customer alerts may be transmitted from the retailer computing device 150 via the network 125 to the customer computing device 120, and the customer computing device 120 may transmit data responsive to the customer alerts and/or other data to the retailer computing device 150 via the network 125.

For example, the retailer computing device 150 may transmit a signal over the network 125 to the customer computing device 120 including an alert indicating that the AGV 110 has dropped off the product 190 at the drop of location 189, or an alert indicating that the AGV 110 was unable to successfully gain access to the restricted area 180. Similarly, the customer computing device 120 may transmit a signal over the network 125 to the retailer computing device 150 including a notification that the product 190 dropped off by the AGV 110 at the drop off location 189 has been successfully picked up by the customer. In some embodiments, customer alerts sent to the customer computing device 120 may include but are not limited to short message service (SMS) messages, electronic mail (e-mail) messages, instant messenger messages, voice mail messages, and/or push notifications (to a mobile app on the customer computing device 120).

FIG. 3 shows an embodiment of an exemplary method 300 for facilitating delivery of a product 190 ordered by a customer to a customer-specified restricted area 180 accessible by an entryway 185 openable via an access code. The embodiment of the method 300 illustrated in FIG. 3 includes providing an AGV 110 configured to retain and transport the product 190 ordered by the customer (step 310) and providing a retailer computing device 150 including a processor-based control circuit 210 (step 320).

In some embodiments, when the AGV 110 moves to within a predetermined distance (e.g., 3 feet, 6 feet, 10 feet, 15 feet, 20 feet, etc.) from the access control unit 187 that controls the opening and closing of the entryway 185 to the restricted area 180, the control circuit 118 of the AGV 110 causes the emitter 116 of the AGV 110 to transmit, via the network 125, a signal including an electronic confirmation that the product 190 ordered by the customer has been delivered by the AGV 110 to the entry way 185 at the restricted area 180. In response to receipt of such an electronic confirmation from the AGV 110, the exemplary method 300 of FIG. 300 includes sending a first signal from the retailer computing device 150 to the AGV 110 via a wireless network 125, the first signal including the access code for opening the entryway 185 (step 330). After the signal including the access code for opening the entryway 185 is transmitted over the network 125 from the retailer computing device 150 to the AGV 110, the exemplary method 300 further includes relaying, via the AGV 110 and in response to receipt of the first signal from the computing device over the wireless network 125, the access code to the access control unit 187 operatively coupled to the entryway 185 (step 340).

In one aspect, the AGV 110 is configured to relay the access code received from the retailer computing device 150 via the emitter 116, which is configured for one or two way communication with the transceiver 188 coupled to the access control unit 187 when the AGV 110 is located within a predetermined distance (e.g., 3 feet, 6 feet, 10 feet, 15 feet, 20 feet, etc.) of the transceiver 188. When the AGV 110 relays the access code received from the retailer computing device 150 to the transceiver 188 coupled to the access control unit 187 that controls the opening and closing of the entryway 185 to the restricted area 180, the method 300 further includes causing the access control unit 187 to open the entryway 185 in response to receiving the access code relayed by the AGV 110 to the access control unit 187 (step 350).

As discussed above, in some embodiments, the retailer computing device 150 determines an optimal travel route for the AGV 110 from the origin of travel (e.g., a deployment station) of the AGV 110 to the destination (e.g., entryway 185 to the restricted area 180 or drop off location 189 in the restricted area 180) of the AGV 110. For example, according to some configurations, the retailer computing device 150 is configured to analyze GPS coordinates of the restricted area 180 designated by the customer, to determine an optimal route for the AGV 110 to the restricted area 180, and to transmit to the AGV 110 a signal over the network 125 including route instructions to guide the AGV 110 to the restricted area 180 and/or to the drop off location 189 along the determined route. To that end, the exemplary method 300 includes transmitting, from the retailer computing device 150, a second signal to the AGV 110 over the wireless network 125, the second signal including movement instructions for the AGV 110 (step 360).

In turn, the AGV 110, upon receipt of such a signal from the retailer computing device 150, is configured to navigate, based on the route instructions, to the entryway 185 of the restricted area 180 and to the drop off location 189 in the restricted area 180 while retaining the products 190 ordered by the customer therein. To that end, the exemplary method 300 of FIG. 3 further includes moving the AGV 110 into the restricted area 180 to deliver the product 190 ordered by the customer based on the movement instructions contained in the second signal received by the AGV 110 from the retailer computing device (step 370). It will be appreciated that after transmitting initial movement instructions to the AGV 110, the control circuit 210 of the retailer computing device 150 according to some embodiments is programmed to recalculate the route of the AGV 110 in real-time, for example, to facilitate avoidance of obstacles along the originally calculated route of the AGV 110.

In some embodiments, the AGV 110 transmits (e.g., via the emitter 116 over the network 125) a signal including an electronic confirmation that the product 190 ordered by the customer has been dropped off by the AGV 110 at the drop off location 189 designated by the customer. In one approach, such an electronic confirmation is sent directly to the retailer computing device 150, although the electronic confirmation may be instead sent to the customer information database 140 for retrieval by the retailer computing device 150. In some embodiments, after receipt from the AGV 110 of such an electronic confirmation, the retailer computing device 150 transmits an electronic notification to the customer computing device 120 indicating that the product 190 ordered by the customer has been dropped off at the drop off location 189. In some configurations, when the route instructions transmitted to the AGV 110 by the retailer computing device 150 include an instruction to the AGV 110 to remain at the drop off location 189 for a predetermined interval of time (e.g., 15 minutes, 30 minutes, 1 hour, or more than 1 hour), the AGV 110 is configured to remain at the drop off location 189 for the period of time indicated in the route instructions. In such situations, the electronic notification transmitted by the retailer computing device 150 to the customer computing device 120 includes an indication of the interval of time that the AGV 110 will wait at the drop off location 189 for the customer to retrieve the product 190 from the cargo space 119 of the AGV 110.

In some embodiments where the AGV 110 is instructed to remain at the drop off location 189 until the customer manually retrieves the product 190 from the cargo space 119 of the AGV 110, the electronic notification transmitted by the retailer computing device 150 to the customer computing device 120 includes a verification code that the customer would be required to provide to the AGV 110 (either via the customer computing device 120 or by manually entering via an interface of the AGV 110) in order to gain access to the cargo space 119 of the AGV 110. As described above, instead of a verification code that must be entered or otherwise transmitted by the customer, the AGV 110 according to some embodiments is equipped with a sensor 114 configured to detect biometric data associated with the customer, enabling the verification of the customer via the biometric data detected by the sensor 114. As described above, the AGV 110, in response to either a control signal from the retailer computing device 150, or a verification code or biometric data entered by the customer, permits the customer to retrieve the product 190 ordered by the customer from the cargo space 119 of the AGV 110.

For example, after the customer or person attempting to retrieve the product 190 from the AGV 110 is authenticated as an authorized person, the AGV 110 either opens the cargo space 119 to permit the customer to remove the product 190 from the cargo space 119, or ejects the product 190 from the cargo space 119 without opening the cargo space 119 to access by the customer. In addition, in some configurations, the emitter 116 of the AGV 110 is also configured to transmit, via the network 125, a signal including an electronic confirmation that the product 190 ordered by the customer has been retrieved by the customer from the AGV 110 at the drop off location 189 in the restricted area 180 designated as the delivery location by the customer.

In one approach, in response to receipt of such an electronic confirmation from the AGV 110, the retailer computing device 150 transmits a signal including updated route instructions to the AGV 110 to guide the AGV 110 back to a deployment station of the AGV 110, or to another restricted area 180 designated as a delivery location by another customer of the retailer. In turn, the AGV 110, upon receipt of such a signal from the retailer computing device 150, navigates either back to a deployment station or to the next delivery destination based on the updated route instructions. In some embodiments, in response to receipt of the electronic confirmation from the AGV 110 that an authorized customer retrieved the product 190 from the AGV 110, the retailer computing device 150 transmits a signal to the order processing server 130 indicating that the order placed by the customer to have the product 190 delivered to the restricted area 180 has been successfully completed.

The systems and methods described herein advantageously allow customers to purchase products from a retailer and have the products conveniently delivered for the customers to restricted areas at the residences of the customers while the customers may be away from their residences. Such systems and methods provide a significant convenience for the customers of the retailer and are likely to increase customer loyalty to the retailer. In addition, such systems and methods provide retailers with significant operation cost savings, since deliveries are made via autonomous ground vehicles that do not require a human operator. In addition, the systems and methods provided herein, by dropping off products in secured areas, increase the likelihood that the product delivered by the autonomous ground vehicles may be stolen by hostile third parties or damages by severe weather conditions.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for facilitating delivery of a product ordered by a customer to a customer-specified restricted area accessible by an entryway openable via an access code, the system comprising:

an autonomous ground vehicle configured to retain and transport the product ordered by the customer, the autonomous ground vehicle including a transceiver and a data store, the data store configured to store electronic information including:
files including at least one of: sensor data, customer identification data, customer order data, navigation and routing data, location data, and autonomous ground vehicle identifier data; and
executable programs that facilitate at least one of operation, control, and
interactive commercial activity of the autonomous ground vehicle;
a computing device including a processor-based control circuit and configured to send a first signal to the transceiver of the autonomous ground vehicle via a wireless network, the first signal including the access code for opening the entryway;
wherein the transceiver of the autonomous ground vehicle is configured to:
receive the first signal including the access code from the computing device over the wireless network;

relay the access code received from the computing device to a control unit operatively coupled to the entryway to cause the control unit to open the entryway in response to receipt of the access code from the autonomous ground vehicle; and wherein the transceiver is configured to relay the access code received from the computing device to the control unit operatively coupled to the entryway without transmitting the access code to be stored in the data store or in any other memory on-board the autonomous ground vehicle, such that the access code received by the transceiver from the computing device is not stored in the data store or in any other memory on-board the autonomous ground vehicle after the transceiver relays the access code to the control unit operatively coupled to the entryway;

wherein the computing device is configured to transmit a second signal to the transceiver of the autonomous ground vehicle via the wireless network, the second signal including a code for closing the entryway; and wherein, in response to receipt of the second signal, the transceiver is configured to:

relay the code for closing the entryway received from the computing device to the control unit operatively coupled to the entryway in order to cause the control unit to close the entryway in response to receipt of the code for closing the entryway relayed by the autonomous ground vehicle; and wherein the transceiver is configured to relay the code for closing the entryway received from the computing device to the control unit operatively coupled to the entryway without transmitting the code for closing the entryway to be stored in the data store or in any other memory on-board the autonomous ground vehicle, such that the code for closing the entryway received by the transceiver from the computing device is not stored in the data store or in any other memory on-board the autonomous ground vehicle after the transceiver relays the code for closing the entryway to the control unit operatively coupled to the entryway.

2. The system of claim 1, wherein the customer-specified restricted area is a garage at a residence of the customer, wherein the system further comprises an order processing server configured to process an order for the product placed by a customer, and wherein the order for the product placed by the customer specifies that the product be delivered via the autonomous ground vehicle to the garage at the residence of the customer.

3. The system of claim 1, wherein the control unit operatively coupled to the entryway is coupled to a transceiver configured to transmit the GPS coordinates of the restricted area, and wherein the computing device is configured to obtain the GPS coordinates of the restricted area based on the GPS coordinates transmitted to the computing device by the transceiver coupled to the control unit operatively coupled to the entryway.

4. The system of claim 1, wherein the computing device is configured to:

obtain global positioning system (GPS) coordinates of the restricted area and GPS coordinates of a physical location of the autonomous ground vehicle; and based on an analysis of the obtained GPS coordinates of the restricted area and of the physical location of the autonomous ground vehicle, determine a route for the autonomous ground vehicle toward the entryway and into the restricted area to deliver the product ordered by the customer.

5. The system of claim 4, wherein the computing device is configured to transmit a third signal to the autonomous ground vehicle over the wireless network, the third signal including movement instructions for the autonomous ground vehicle based on the determined route; and wherein the autonomous ground vehicle, after receipt of the third signal from the computing device over the wireless network, is configured to move into the restricted area, based on the movement instructions contained in the third signal, to deliver the product ordered by the customer.

6. The system of claim 1, wherein the transceiver of the autonomous ground vehicle is configured to receive the movement instructions in the third signal transmitted to the autonomous ground vehicle from the computing device, the transceiver being configured to send one or more signals to the computing device over the wireless network.

7. The system of claim 1, wherein the autonomous ground vehicle is configured to transmit to the computing device a first electronic notification including a confirmation that the product ordered by the customer is located in the restricted area, and wherein, in response to receipt of the first electronic notification from the autonomous ground vehicle, the control circuit of the computing device is configured to transmit, to a mobile computing device of the customer, an electronic alert that the product ordered by the customer is located in the restricted area.

8. The system of claim 7, wherein the autonomous ground vehicle, after transmission of the first electronic notification to the computing device, is configured to remain in the restricted area and retain the product ordered by the customer until the product ordered by the customer is retrieved by the customer from the autonomous ground vehicle, and wherein the autonomous ground vehicle is configured to transmit to the computing device a second electronic notification including a confirmation that the product ordered by the customer has been retrieved by the customer from the autonomous ground vehicle in the restricted area.

9. The system of claim 7, wherein the autonomous ground vehicle, after transmission of the first electronic notification to the computing device, is configured to drop the product retained therein onto a product drop-off location in the restricted area and to exit the restricted area, and wherein the autonomous ground vehicle is configured to transmit to the computing device a second electronic notification including a confirmation that the product ordered by the customer has been dropped off by the autonomous ground vehicle at the product drop-off location in the restricted area.

10. The system of claim 9, wherein the computing device is configured to transmit the second signal to the autonomous ground vehicle via the wireless network after receipt of the second electronic notification from the autonomous ground vehicle.

11. A method for facilitating delivery of a product ordered by a customer to a customer-specified restricted area accessible by an entryway openable via an access code, the method comprising:

providing an autonomous ground vehicle configured to retain and transport the product ordered by the customer, the autonomous ground vehicle including a transceiver and a data store, the data store configured to store electronic information including:

files including at least one of: sensor data, customer identification data, customer order data, navigation and routing data, location data, and autonomous ground vehicle identifier data; and executable programs that facilitate at least one of operation, control, and
interactive commercial activity of the autonomous ground vehicle;
providing a computing device including a processor-based control circuit;
sending a first signal from the computing device to the transceiver of the autonomous ground vehicle via a wireless network, the first signal including the access code for opening the entryway;
by the transceiver of the autonomous ground vehicle and in response to receipt of the first signal from the computing device over the wireless network, relaying the access code received from the computing device to a control unit operatively coupled to the entryway to cause the control unit to open the entryway in response to receipt of the access code from the autonomous ground vehicle; and
relaying, by the transceiver, the access code received from the computing device to the control unit operatively coupled to the entryway without transmitting the access code to be stored in the data store or in any other memory on-board the autonomous ground vehicle, such that the access code received by the transceiver from the computing device is not stored in the data store or in any other memory on-board the autonomous ground vehicle after the transceiver relays the access code to the control unit operatively coupled to the entryway;
transmitting, by the computing device, a second signal to the transceiver of the autonomous ground vehicle via the wireless network, the second signal including a code for closing the entryway; and
in response to receipt of the second signal, relaying, by the transceiver, the code for closing the entryway received from the computing device to the control unit operatively coupled to the entryway in order to cause the control unit to close the entryway in response to receipt of the code for closing the entryway relayed by the autonomous ground vehicle; and
relaying, by the transceiver, the code for closing the entryway received from the computing device to the control unit operatively coupled to the entryway without transmitting the code for closing the entryway to be stored in the data store or in any other memory on-board the autonomous ground vehicle, such that the code for closing the entryway received by the transceiver from the computing device is not stored in the data store or in any other memory on-board the autonomous ground vehicle after the transceiver relays the code for closing the entryway to the control unit operatively coupled to the entryway.

12. The method of claim 11, wherein the customer-specified restricted area is a garage at a residence of the customer, and further comprising providing an order processing server configured to process an order for the product placed by a customer, and wherein the order for the product placed by the customer specifies that the product be delivered via the autonomous ground vehicle to the garage at the residence of the customer.

13. The method of claim 11, wherein the control unit operatively coupled to the entryway is coupled to a transceiver configured to transmit the GPS coordinates of the restricted area, and further comprising, obtaining, by the computing device, the GPS coordinates of the restricted area based on the GPS coordinates transmitted to the computing device by the transceiver coupled to the control unit operatively coupled to the entryway.

14. The method of claim 11, further comprising:
obtaining, by the computing device, global positioning system (GPS) coordinates of the restricted area and GPS coordinates of a physical location of the autonomous ground vehicle; and
based on an analysis of the obtained GPS coordinates of the restricted area and of the physical location of the autonomous ground vehicle, determining, by the computing device, a route for the autonomous ground vehicle toward the entryway and into the restricted area to deliver the product ordered by the customer.

15. The method of claim 14, further comprising:
transmitting, from the computing device, a third signal to the autonomous ground vehicle over the wireless network, the third signal including movement instructions for the autonomous ground vehicle based on the determined route; and
after receipt of the third signal from the computing device over the wireless network and by the autonomous ground vehicle, moving into the restricted area, based on the movement instructions contained in the third signal, to deliver the product ordered by the customer.

16. The method of claim 11, further comprising receiving, by the transceiver of the autonomous ground vehicle, the movement instructions in the third signal transmitted to the autonomous ground vehicle from the computing device, the transceiver being configured to send one or more signals to the computing device over the wireless network.

17. The method of claim 11, further comprising:
transmitting, from the autonomous ground vehicle to the computing device, a first electronic notification including a confirmation that the product ordered by the customer is located in the restricted area; and
in response to receipt of the first electronic notification from the autonomous ground vehicle, transmitting, via the control circuit of the computing device to a mobile computing device of the customer, an electronic alert that the product ordered by the customer is located in the restricted area.

18. The method of claim 17, further comprising:
after transmission of the first electronic notification to the computing device, causing the autonomous ground vehicle to remain in the restricted area and retain the product ordered by the customer until the product ordered by the customer is retrieved by the customer from the autonomous ground vehicle; and
transmitting, from the autonomous ground vehicle to the computing device, a second electronic notification including a confirmation that the product ordered by the customer has been retrieved by the customer from the autonomous ground vehicle in the restricted area.

19. The method of claim 17, further comprising:
after transmission of the first electronic notification to the computing device, causing the autonomous ground vehicle to drop the product retained therein onto a product drop-off location in the restricted area and to exit the restricted area;
transmitting, from the autonomous ground vehicle to the computing device, a second electronic notification including a confirmation that the product ordered by the customer has been dropped off by the autonomous ground vehicle at the product drop-off location in the restricted area.

20. The method of claim 19, further comprising transmitting from the computing device and via the wireless network, the second signal to the autonomous ground vehicle after receipt of the second electronic notification from the autonomous ground vehicle.

\* \* \* \* \*